July 19, 1966 R. T. CORNELIUS 3,261,507
METHOD AND MEANS FOR TREATING AND HANDLING COFFEE BEVERAGE
Filed July 1, 1963

INVENTOR.
Richard T. Cornelius
BY
ATTORNEYS

３,261,507
METHOD AND MEANS FOR TREATING AND HANDLING COFFEE BEVERAGE
Richard T. Cornelius, Minneapolis, Minn., assignor to The Cornelius Company, Anoka, Minn., a corporation of Minnesota
Filed July 1, 1963, Ser. No. 291,618
19 Claims. (Cl. 222—146)

This invention relates generally to coffee beverage, and more specifically to a method for treating the same to effect preservation thereof, and to a method and means for handling or dispensing such preserved product.

Although the principles of the present invention may be included in various devices, a particularly useful application is made in commercial and industrial installations, and in coin-operated dispensing equipment. Such application is illustrative, and does not exclude domestic usage.

It is well known that brewed coffee beverage has limited keeping qualities. This is particularly a problem in the coffee dispensing machine industry, as well as in the industrial catering industry. Certain present coffee dispensing machines employ a large thermos bottle, or equivalent, which must be serviced once a day. To management, this is a tremendous burden which imposes practical limitations on the geographical radius within which a business can be profitably operated, and imposes an economic limitation on the minimum usage required to make installation of such a machine profitable. Other dispensing machines employ apparatus for automatically brewing coffee in small or medium-sized batches, either as needed or periodically. The periodic type of machine discards coffee beverage which has not been vended within a predetermined time, to ensure maintenance of a relatively high standard of flavor. This practice is uneconomic and wasteful. Further, when a batch-type machine goes into a brewing cycle, it is inherent that time will be consumed to accomplish this result. Such consumption of time has been found to be extremely costly. For example, I have seen coffee purchasers line up at such a machine for as long as fifteen minutes in a "coffee break" where a small fraction of that elapsed time should have sufficed to service everyone. Other coin-operated coffee making and dispensing machines employ a syrup-type of coffee extract, employ instant coffee powder, or employ compressed coffee pellets. The public has demonstrated that the flavor of coffee beverage made from coffee syrup or pellets is not satisfactory, and that coffee beverage made from instant (powdered) coffee, to discriminating purchasers, does not quite come up to that of freshly brewed coffee. Moreover, all but one of the foregoing types of machines have the inherent disadvantage of being compelled to employ for such coffee making, such water as is available on the location where the machine is situated.

In accordance with the principles of the present invention, the keeping qualities of brewed coffee is dramatically extended. Such brewed or prepared coffee beverage is treated, such as at one location having ideally flavored water, and may thereafter be transported to other sites, such as for use in industrial catering equipment, home consumption, or vending machines. In accordance with the principles of this invention, I have kept coffee beverage as long as two weeks without deterioration of flavor and without refrigeration. Therefore, a dispensing machine operating in accordance with this invention does not employ heat, refrigeration, or insulation for the main supply of coffee beverage. Moreover, it need not be serviced every day, but solely in response to user demand. Very importantly, there is no significant deterioration in flavor from that present when the beverage was initially brewed. An unexpected result is that the flavor of coffee beverage made from instant coffee powder is somewhat improved, and has been judged to be indistinguishable from freshly brewed coffee. Also, and very importantly, the batch-type of heating is avoided so that a vending machine embodying this invention is automatically responsive to a wide range of rate of user demand.

It is well known that coffee beverage is highly popular. It is also well known that soft drinks are also highly popular. Attempts have been made in the past to provide a carbonated coffee beverage. These attempts have all been unsuccessful since the consuming public has found the resulting product to be unpalatable. I have confirmed that a slight amount of carbonation renders coffee beverage useless from the taste standpoint. As the degree of carbonation has increased, the unpalatability has likewise increased.

In accordance with the principles of this invention I provide a high degree of carbonation in the prepared coffee beverage, and thereafter decarbonate the same, by removing carbon dioxide therefrom, to prepare the same for consumption. Heavily carbonated coffee is stored at room temperature under pressure for an extended period of time, namely until there is a demand for its use. Preferably, a small quantity or portion thereof is conducted to a heating chamber in which the pressure is reduced and the temperature of the brewed coffee is raised. This heating may include agitation. By such a change in ambient conditions, the dissolved carbon dioxide gas is nearly completely driven from the brewed coffee, and such gas is vented through a low-pressure relief valve to the atmosphere. The relief valve provides a low pressure of carbon dioxide gas above the heated coffee, which still may contain a trace of carbonation. In this heating zone, I have observed that coffee will keep at least two days. From this heating zone, the coffee is dispensed, and the agitation inherent in dispensing removes all traces of adverse effect of carbon dioxide on the flavor. At this point, coffee which is either freshly brewed or which is aged has a normally freshly brewed flavor. The foregoing is accomplished entirely automatically as explained herein.

Accordingly, it is an object of the present invention to provide a method and means for preserving coffee beverage.

Another object of the present invention is to provide a method and means for dispensing coffee beverage.

Yet another object of the present invention is to provide a method for treating a coffee beverage.

A still further object of the present invention is to preserve or otherwise treat coffee beverage by carbonating it, and subsequently, after an appropriate period of elapsed time, restoring the palatability thereof by removing carbon dioxide therefrom.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

Figure 1:
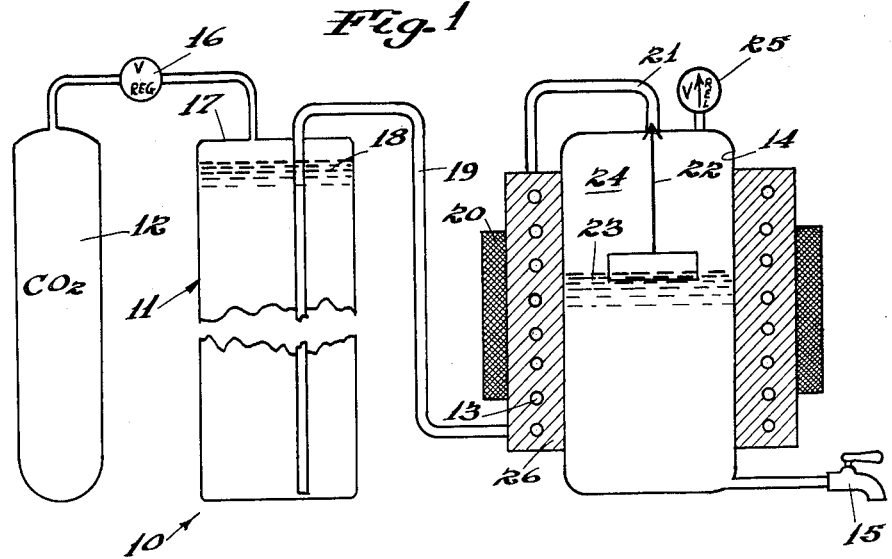
FIGURE 1 is a diagrammatic view of a system for handling or treating coffee beverage, provided in accordance with the principles of the present invention.

The principles of the present invention are particularly useful when embodied in a preferred form of coffee beverage dispensing apparatus such as illustrated in FIG- URE 1, generally indicated by the numeral 10. The dispensing apparatus 10 includes a supply of highly carbonated coffee beverage 11 which is stored under a substantially constant pressure of carbon dioxide gas provided by a tank 12 thereof, the coffee beverage supply 11 communicating with a heating coil 13 by which only a portion of the supply of carbonated coffee is heated, the coil 13 discharging into a chamber 14, and from which an appropriate dispensing valve 15 may withdraw a selected amount of substantially totally decarbonated coffee beverage.

At the outset, the supply 11 is filled with a quantity of carbonated coffee beverage. This step can be accomplished at a central geographic location where preferably pure water is available, namely water which is free of chlorine or other impurity. The method may be practiced using any ordinary type of coffee beverage, but preferably is practiced employing coffee which has been freshly brewed from fresh ground coffee beans. It appears that use of filtered water is advantageous in providing maximum storage or shelf life. After the fresh infusion of water and ground coffee has cooled, the same is provided with a relatively high level of carbonation, there being from 2 to 4 volumes of carbon dioxide gas dissolved therein under a pressure of about 40 p.s.i.

A comparable product is obtained which has nearly as long storage or shelf life by admixing "instant" or powdered coffee with water having the desired level of carbonation.

Either of the above freshly made representative infusions of carbonated coffee beverage may be stored at room temperature under a pressure which is substantially the carbonating pressure, such as 40 p.s.i. I have regularly obtained a storage life at room temperature of such freshly brewed infusion (ground coffee) of two weeks, and a storage life of such freshly admixed infusion (instant coffee) of ten days, without any deterioration of flavor, the storage product of course being treated further as described herein prior to consumption. Moreover, the ultimate flavor obtained from the instant coffee infusion described above is somewhat improved over that which would be obtained without resort to the process of this invention. Carbon dioxide gas is present in the storage vessel or tank above the carbonated coffee beverage, thereby keeping oxygen away from the surface thereof. So far as I have been able to determine, the storage product described herein, without subsequent decarbonation, is bitter and unpalatable. However, when the storage product has been decarbonated, the initial ideal flavor is restored.

To restore the desired flavor, it is necessary that the storage product be substantially totally decarbonated. The decarbonation step is accomplished when consumption is imminent, since doing so limits the remaining storage life in my preferred embodiment to about two days. By "substantially totally decarbonating," I mean that the level of carbonation has been decreased to such an extent that the bitterness is gone, and any minute quantity or trace which remains is so small as not to be detectable to the taste. This decarbonation can be accomplished in various ways. By way of example, either increasing the temperature of the storage product, or agitating the storage product, or both increasing the temperature of the storage product and agitating it, drives out dissolved carbon dioxide gas. If decarbonation occurs relatively rapidly, a foam forms, as on a glass of freshly drawn beer, such coffee foam being temporary and soon and readily breaking up into carbon dioxide gas and liquid coffee. By the decarbonation step, the coffee beverage is deliberately caused to go "flat."

The portion of coffee which has been withdrawn from the supply of carbonated coffee beverage is heated to serving temperature, which ordinarily is within the range of 140° to 210° F. Preferably, such heating is to a temperature of 180° F. for storing, for dispensing, and for driving off carbon dioxide gas. The amount of carbon dioxide gas which will be retained under these conditions is negligible, and assuming that the same is detectable to taste, even this trace will be removed of itself in response to the agitation which is inherent in withdrawing a serving through the valve 15. Decarbonation is therefore accomplished by a combination of heating, releasing pressure, and agitating.

In the embodiment in FIGURE 1, the carbon dioxide gas in the pressure tank 12 is delivered at a constant pressure regulated or controlled by a pressure reducer or regulator valve 16 and is discharged into a tank 17 which comprises a part of the supply 11. Liquid carbonated coffee 18 is thus propelled by tank gas through a line 19 into the heating coil 13. The heating coil 13 is here illustrated as being embedded in a block of aluminum or magnesium which is heated by an electric coil 20. Preferably the rate of flow from the supply 11 through the coil 13 is limited to the recovery rate provided by the heating structure.

The upper end of the coil 13 terminates in a line 21 which discharges into the chamber-defining means 14 under the control of an appropriate mechanism, here schematically indicated as being a float valve 22. As carbonated heated coffee beverage is admitted to the chamber means 14, its pressure is reduced from the storage pressure, such as from 30 to 50 pounds, to a pressure slightly above atmospheric. Such reduction in pressure alone causes the carbonated coffee beverage to break up, namely for it to turn into foam, or namely for it to yield up its carbon dioxide gas. However, the agitation inherent in passing through the float valve 22 accelerates the break up.

The float valve 22 is so constructed that the liquid in the chamber means 14 will only partially fill such chamber. Thus at 23 there is illustrated decarbonated coffee beverage which is at a level that precludes further admission of carbonated coffee thereto. As decarbonated coffee beverage is withdrawn from the valve 15, the float valve 22 opens to admit further heated coffee and to decarbonate the same, there thus being a space 24 above the decarbonated coffee 23 for accommodating the foam which is produced.

The gas which escapes during the decarbonation process is vented to the atmosphere through a relief valve 25, the relief valve 25 being set to open and close within the range of ½ to 5 p.s.i., and preferably within the range of 3 to 4 p.s.i. Thus carbon dioxide gas is trapped in the space 24 above the decarbonated coffee 23 to inhibit deterioration thereof, there still being a trace of carbonation present in such "decarbonated" coffee which escapes when the same is drawn into a cup or other receptacle.

The recovery rate of the beverage coil 13 should be approximately three drinks or servings per minute when the structure is embodied in a dispensing machine. This requires approximately 1500 watts input for the heating coil 20. It is desirable that the chamber means 14 be jacketed as shown by an appropriate heat sink 26, and to this end, any other suitable material may be employed. In a typical embodiment, the decarbonated coffee 23 comprises a quantity of at least 5 or 6 cups, and I have found that with such structure as illustrated here, the nearly fully decarbonated coffee will keep for two days under the pressure conditions described.

Figure 2:
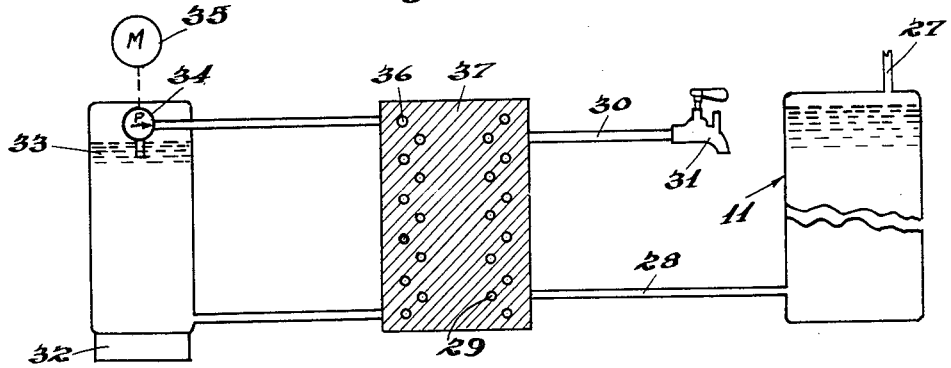
FIGURE 2 is a diagrammatic view of another form thereof.

It is also possible to increase the pressure of the stored heated coffee if suitable provision is made for agitation and gas escape later. The embodiments shown in FIGURES 2 and 3 in effect provide connecting the dispensing valve to the line 21. In FIGURE 2, the supply of carbonated beverage 11 is connected by a line 27 to the regulator 16 as described before. A line 28, corresponding to the line 19, is connected to a coil 29, the other end of which coil is connected through a line 30 to a vented jet valve 31. A heater 32 heats a quantity of heat exchange liquid 33 which is circulated by a pump 34 driven by a motor 35 through a coil 36 in a counter flow method. Thus the incoming heated fluid 33 enters the uppermost turn of the coil 36, while the incoming cooler carbonated beverage enters the lowest turn of the coil 29. Both of the coils 29 and 36 are embedded in a suitable heat exchanger or sink 37. Other means of mechanically agitating the dispensed liquid from the line 30 may be employed.

Figure 3:
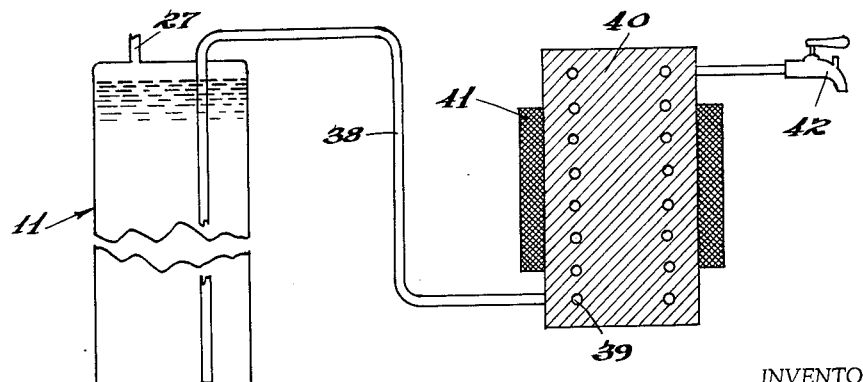
FIGURE 3 is a further diagrammatic view of a still further form thereof.

In FIGURE 3, the carbonated coffee is fed through a line 38 to a coil 39 disposed in a heat sink 40 heated by a heater 41 for selective withdrawal through a suitable vented jet valve 42.

I have found that the flavor of the decarbonated coffee beverage produced by this method and apparatus is equal to or better than that which the user is accustomed to drinking.

The heat exchange fluid 33 may be boiling water.

In the structure schematically illustrated in FIGURE 1, the coil 20 severs to heat both the heat sink 26 and to maintain the temperature of the decarbonated coffee 23 in the chamber-defining-means 14.

The method and means 12, 16 by which the carbonated coffee beverage 18 is pressurized in the supply tank 11 is illustrative and exemplary. It is to be understood that the claim elements directed to such pressurization should be interpreted as to cover other means of obtaining such result, among which is the placing of an appropriate charge of pressurized gas in the tank 11 above the beverage 18, whereby the separate gas cylinder 18 may be omitted, all as disclosed in greater detail and claimed in my copending application, U.S. Serial No. 178,312, filed March 8, 1962, on a "Method and Apparatus for Dispensing Carbonated Beverages."

Although various minor modifications might be suggested by those versed in the art, it should be understood that I wish to embody within the scope of the patent warranted hereon all such embodiments as reasonably and properly come within the scope of my contribution to the art.

I claim as my invention:

1. A process for handling a previously made fresh infusion of coffee beverage, comprising:
    (a) carbonating such an infusion of serving strength to dissolve about 2 to 4 volumes of carbon dioxide therein;
    (b) storing the resulting product at room temperature at substantially the carbonating pressure; and
    (c) thereafter when consumption is imminent, substantially totally decarbonating such carbonated product to prepare it for such imminent consumption.

2. A combined process for handling and readying for consumption a supply of an already highly carbonated infusion of coffee beverage, comprising:
    (a) applying a substantially constant pressure of carbon dioxide gas to the supply of already carbonated coffee beverage for an indefinite period of time;
    (b) reducing the pressure on only a portion of such carbonated coffee beverage to a pressure above atmospheric; and
    (c) substantially totally decarbonating such portion.

3. A process as claimed in claim 2 in which said constant pressure is substantially the carbonation pressure thereof.

4. A combined process for handling and readying for consumption a supply of an already highly carbonated infusion of coffee beverage, comprising:
    (a) applying a substantially constant pressure of carbon dioxide gas to the supply of already carbonated coffee beverage for an indefinite period of time;
    (b) reducing the pressure on only a portion of such carbonated coffee beverage to a pressure slightly above atmospheric; and
    (c) heating said slightly pressurized portion to serving temperature, thereby also driving dissolved carbon dioxide therefrom and thereby also slightly pressurizing a space thereabove.

5. A process as claimed in claim 4 in which said reducing of pressure is substantially simultaneously accompanied by physically perturbing the liquid and by said heating.

6. A combined process for handling and readying for consumption a supply of an already highly carbonated infusion of coffee beverage, comprising:
    (a) applying a substantially constant pressure of carbon dioxide gas to the supply of already carbonated coffee beverage for an indefinite period of time, said pressure being such as to maintain the carbonation thereof;
    (b) in response to demand for decarbonated coffee beverage, automatically transferring a portion of such carbonated coffee beverage from the supply;
    (c) applying heat to such transferred portion of such temperature as to render it unstable;
    (d) reducing the pressure on the heated portion to a pressure above atmospheric, thereby causing release of carbin dioxide therefrom; and
    (e) separating released carbon dioxide gas from the liquid beverage for readying the latter for consumption.

7. A process as claimed in claim 6, in which said reducing of pressure is effected by discharging the heated portion into a vented chamber having the pressure above atmospheric, and applying heat to said chamber to maintain it at beverage-serving temperature.

8. A combined process for handling and readying for consumption a supply of an already highly carbonated infusion of coffee beverage, comprising:
    (a) storing the supply of the already carbonated coffee beverage in bulk under a substantially constant pressure of carbon dioxide gas for an indefinite period of time;
    (b) automatically heating a so-pressurized portion of said supply, whose consumption is imminent, to bring its temperature up to approximately 180° F.;
    (c) thereafter automatically lowering the pressure on said portion to be within the range of ½ to 5 p.s.i., thereby forming temporary foam which breaks into carbon dioxide gas pressurizing said portion at a pressure within said range; and
    (d) withdrawing a selected amount of decarbonated beverage from said portion, for consumption.

9. A process as claimed in claim 6, in which said pressure on said portion is within the range of 3 to 4 p.s.i.

10. Apparatus for handling and readying a beverage for consumption from a supply of highly carbonated beverage, comprising:
    (a) a storage tank for storing the supply of carbonated beverage at room temperature;
    (b) means for applying a substantially constant pressure of carbon dioxide gas to said storage tank;
    (c) means disposed remotely from, in non-heat transfer relation to, and fluidly communicating with said storage tank and receptive of a portion of the supply of carbonated beverage, said communicating means being operative to heat said portion to a dispensing temperature and to cause said portion to break up as as temporary foam; and
    (d) a dispensing valve connected to said communicating means.

11. Apparatus for handling and readying a beverage for consumption from a supply of highly carbonated beverage, comprising:
    (a) a storage tank for storing the supply of carbonated beverage at room temperature;
    (b) means for applying a substantially constant pressure of carbon dioxide gas to said storage tank;
    (c) chamber-defining-means disposed remotely from, in non-heat transfer relation to, and fluidly connected to said storage tank for being only partially filled by a liquid portion of the supply of carbonated beverage;

(d) heating means for acting on said portion of the supply to drive dissolved carbon dioxide therefrom into the space above the decarbonated beverage in said chamber; and (e) a dispensing valve connected to the lower part of said chamber-defining-means.

12. Apparatus as claimed in claim 43, which includes a relief valve connected to said chamber-defining-means and communicating with said space for maintaining a pressure therein slightly above atmospheric.

13. Apparatus as claimed in claim 11, wherein said communicating means includes means for perturbing said portion.

14. Apparatus for handling and treating a beverage for consumption from a supply of highly carbonated beverage, comprising:

(a) a storage tank for storing the supply of carbonated beverage at room temperature;

(b) means for applying a substantially constant pressure of carbon dioxide gas to said storage tank;

(c) means disposed remotely from, in non-heat transfer relation to, and fluidly connected to said storage tank for receiving and heating only a portion of the supply of carbonated beverage to a temperature between room temperature and boiling;

(d) means connected to said last named means for receiving said heated portion, being operative thereon to reduce the pressure on said heated portion for thereby producing decarbonated beverage and temporary foam;

(e) chamber-defining-means connected fluidly to the previously named means and receptive of said reduced pressure portion; and (f) a dispensing valve connected fluidly to the lower part of said chamber-defining-means for selectively withdrawing heated decarbonated beverage from said chamber for consumption.

15. Apparatus as claimed in claim 14 in which said chamber-defining-means also includes heating means for heating said reduced pressure portion.

16. Apparatus as claimed in claim 14 in which said chamber-defining-means includes means for only partially filling said chamber with liquid beverage, thereby providing a space thereabove for the temporary foam and released carbon dioxide.

17. Apparatus for handling and treating a beverage from a supply of highly carbonated beverage, comprising:

(a) a storage tank for storing the supply of previously carbonated beverage at room temperature;

(b) means for applying a substantially constant pressure of carbon dioxide gas to said storage tank;

(c) means disposed remotely from, in non-heat transfer relation to, and fluidly connected to said storage tank for receiving and heating only a portion of the supply of carbonated beverage to a temperature between room temperature and boiling; and (d) means operative to reduce the pressure on the heated portion for releasing carbon dioxide therefrom and said means being also operative to separate the released carbon dioxide gas from the decarbonated liquid in response to withdrawal of the latter from said receiving means for consumption.

18. Apparatus for handling and treating a beverage for consumption from a room-temperature supply of highly carbonated beverage, comprising:

(a) a heating coil adapted to be connected at one end to receive carbonated beverage from said supply;

(b) a chamber-defining-means connected to receive heated carbonated beverage from the other end of said coil;

(c) a heater operative on both said coil and said chamber-defining-means to raise the temperature of the carbonated beverage to a level where its carbonation is unstable; and (d) a dispensing valve communicating with said chamber.

19. Apparatus as claimed in claim 18 which includes normally closed means operative in response to the liquid level in said chamber-defining-means to automatically control the flow of carbonated beverage from said coil into said chamber-defining-means.

References Cited by the Examiner
UNITED STATES PATENTS

| | | | |
|---|---|---|---|
| 1,187,591 | 6/1916 | Woodry | 222—190 X |
| 2,115,453 | 4/1938 | Baker | 55—195 X |
| 2,307,589 | 1/1943 | Johnson. | |
| 2,499,243 | 2/1950 | Franklin | 99—189 X |
| 2,759,638 | 8/1956 | Howard | 222—146 |
| 2,977,231 | 3/1961 | Fox et al. | 99—79 |

OTHER REFERENCES

Tea and Coffee Trade Journal, vol. 119, No. 6, 1960, pp. 36 to 40.

A. LOUIS MONACELL, *Primary Examiner.*

A. LOUIS MONACELL, *Primary Examiner.*

M. W. GREENSTEIN, *Assistant Examiner.*